United States Patent
Sisken et al.

(10) Patent No.: US 6,820,600 B1
(45) Date of Patent: Nov. 23, 2004

(54) METHOD FOR CONTROLLING AN ENGINE WITH AN EGR SYSTEM

(75) Inventors: Kevin Dean Sisken, Saline, MI (US); Xuetong Fan, Ann Arbor, MI (US)

(73) Assignee: Detroit Deisel Corporation, Detroit, MI (US)

( * ) Notice: Subject to any disclaimer, the term of this patent is extended or adjusted under 35 U.S.C. 154(b) by 0 days.

(21) Appl. No.: 10/474,884

(22) PCT Filed: Sep. 19, 2002

(86) PCT No.: PCT/US02/29781
§ 371 (c)(1),
(2), (4) Date: Oct. 15, 2003

(87) PCT Pub. No.: WO2004/027244
PCT Pub. Date: Apr. 1, 2004

(51) Int. Cl.[7] ............ F02M 25/07; G06F 19/00
(52) U.S. Cl. ............ 123/568.21; 701/106; 701/108; 60/605.2
(58) Field of Search ............ 123/568.21, 568.12; 701/106, 108; 60/605.2

(56) References Cited

U.S. PATENT DOCUMENTS

| | | | |
|---|---|---|---|
| 5,190,020 A | * 3/1993 | Cho | 123/478 |
| 5,520,161 A | * 5/1996 | Klopp | 123/568.24 |
| 5,537,977 A | * 7/1996 | Hartman et al. | 123/406.46 |
| 6,032,656 A | 3/2000 | Itoyama et al. | |
| 6,148,616 A | 11/2000 | Yoshida et al. | |
| 6,227,182 B1 | 5/2001 | Muraki et al. | |
| 6,305,167 B1 | 10/2001 | Weisman, II et al. | |
| 6,738,707 B2 | * 5/2004 | Kotwicki et al. | 701/108 |
| 2003/0093212 A1 | * 5/2003 | Kotwicki et al. | 701/102 |

* cited by examiner

*Primary Examiner*—Carl S. Miller
*Assistant Examiner*—Arnold Castro
(74) *Attorney, Agent, or Firm*—Brooks Kushman P.C.

(57) ABSTRACT

A method for controlling an internal combustion engine (10) is provided. The engine (10) includes an exhaust gas recirculation (EGR) system (18, 20). The method includes determining an air mass flow rate through the intake manifold at a location upstream of the exhaust gas introduction, and determining an engine volumetric efficiency based on an engine speed and an intake manifold air density. An EGR flow rate is determined based on the volumetric efficiency, the intake manifold air density, an engine displacement volume, the engine speed, and the intake manifold air mass flow rate. The engine (10) is controlled based on the EGR flow rate. Preferred techniques for determining engine volumetric efficiency and EGR flow rate are also provided.

8 Claims, 1 Drawing Sheet

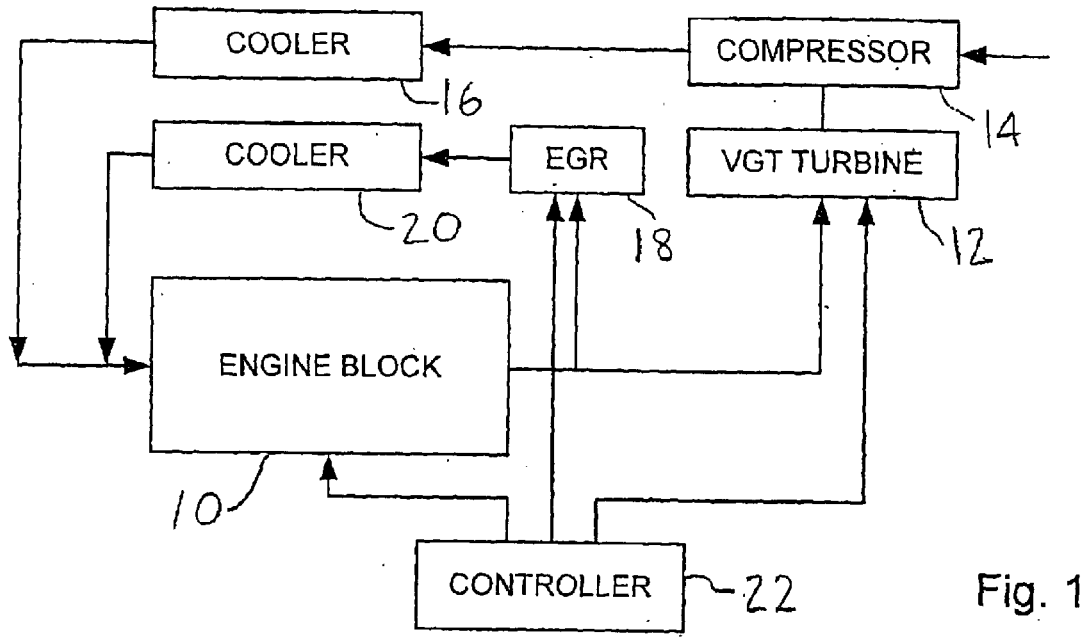
Fig. 1
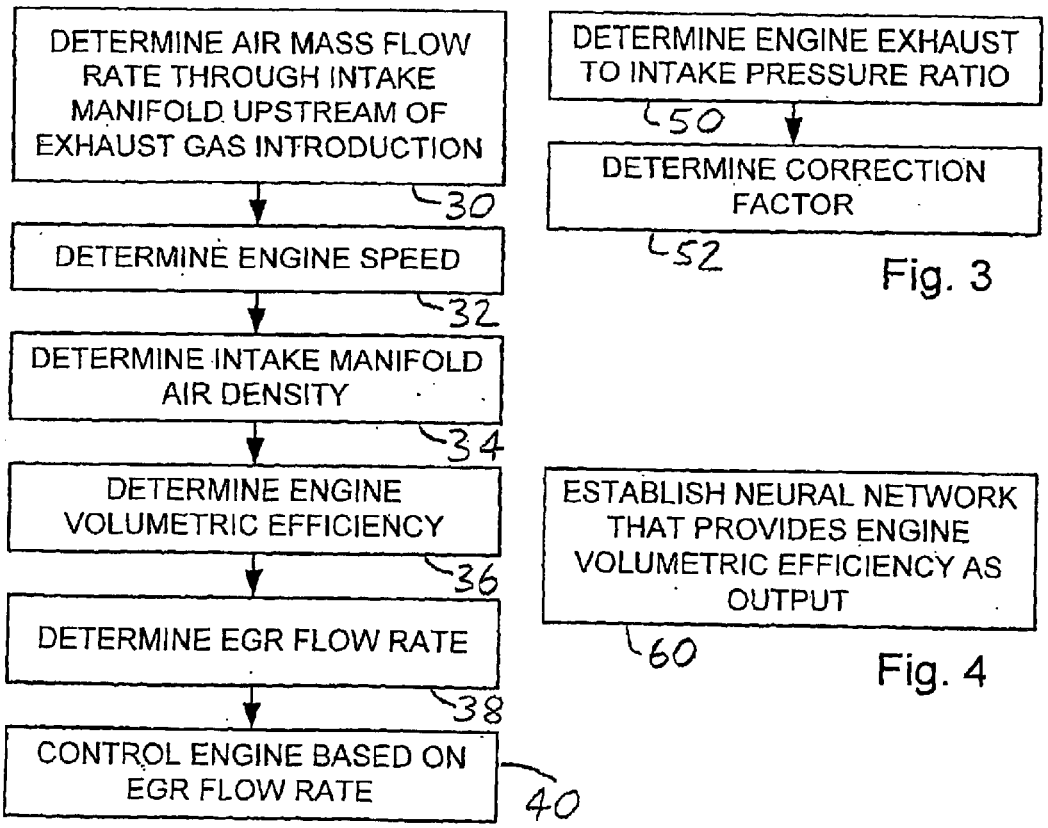
Fig. 2
Fig. 3
Fig. 4

METHOD FOR CONTROLLING AN ENGINE WITH AN EGR SYSTEM

STATEMENT REGARDING FEDERALLY SPONSORED RESEARCH AND DEVELOPMENT

This invention was made with United States Government support, and the United States Government has certain rights in this invention.

BACKGROUND OF THE INVENTION

1. Field of the Invention

The present invention relates to a method for controlling an internal combustion engine including an exhaust gas recirculation (EGR) system.

2. Background Art

In the control of internal combustion engines, the conventional practice utilizes an engine controller with inputs, outputs, and a processor that executes instructions to control the engine including its various systems. The engine may include a variable geometry turbocharger (VGT) system and an exhaust gas recirculation (EGR) system. U.S. Pat. No. 6,305,167 describes an existing method of controlling an engine. The engine business is quite competitive. Increasing demands are being placed on manufacturers to provide improved performance, reliability, and durability while meeting increasing emissions requirements.

An EGR system introduces a metered portion of exhaust gases through an EGR valve into the intake manifold of the engine. The exhaust gases lower combustion temperatures to reduce the level of oxides of nitrogen ($NO_x$) that are produced. The EGR valve itself may take any suitable form such as a butterfly valve. The EGR system has been used on many engines, including heavy-duty diesel engines. Sometimes, these heavy duty diesel engines employ a turbocharger system such as a variable geometry turbocharger (VGT) system in addition to the EGR system.

Exhaust gas recirculation (EGR) is considered one of the enabling technologies for reduction of $NO_x$ emission in diesel engine exhaust. And the reduction of $NO_x$ using EGR usually comes with an increase in particulate matters (PM) emission. To achieve the best trade-off of $NO_x$, vs. PM, precise engine control, including the control of EGR flow rate especially, is critical. The control strategy for diesel engines equipped with EGR requires time-averaged EGR flow rate as an input parameter and the current technology is to use an orifice or venturi type of flow meter in the EGR circuit to directly measure EGR flow rate. Because the EGR flow, usually taken from turbo housing or exhaust manifold, is highly pulsating, it is a technical challenge to obtain accurate EGR flow rate measurement and its time averaged value. In addition, the flow meter increases the flow restrictions in the EGR circuit and could also be contaminated by the soot-containing EGR flow, resulting in loss of accuracy or even sensor malfunction.

For the foregoing reasons, there is a need for an improved method for controlling an engine.

SUMMARY OF THE INVENTION

It is, therefore, an object of the present invention to provide an improved method for controlling an engine with an EGR system in which EGR flow rate is determined without direct measurement of it in the EGR circuit.

In carrying out the above object, a method for controlling an internal combustion engine is provided. The engine includes an engine block defining a plurality of cylinders, an intake manifold for supplying air to the plurality of cylinders, a controller, and an exhaust gas recirculation (EGR) system. The EGR system introduces a metered portion of exhaust gases to the intake manifold. The controller communicates with the EGR system to control the engine. The method comprises determining an air mass flow rate through the intake manifold at a location upstream of the exhaust gas introduction. The method further comprises determining an engine speed, determining an intake manifold air density, and determining an engine volumetric efficiency. The engine volumetric efficiency is based on the engine speed and the intake manifold air density. The method further comprises determining an EGR flow rate based on the volumetric efficiency, the intake manifold air density, an engine displacement volume, the engine speed, and the intake manifold air mass flow rate. The method further comprises controlling the engine based on the EGR flow rate.

Further, in carrying out the present invention, an internal combustion engine is provided. The engine includes an engine block defining a plurality of cylinders, an intake manifold for supplying air to the plurality of cylinders, a controller, and an exhaust gas recirculation (EGR) system. The EGR system introduces a metered portion of exhaust gases to the intake manifold. The controller communicates with the EGR system to control the engine. The controller is programmed to control the internal combustion engine by determining an air mass flow rate through the intake manifold at a location upstream of the exhaust gas introduction. An engine speed and an intake manifold air density are determined. An engine volumetric efficiency is determined based on the engine speed and the intake manifold air density. An EGR flow rate is determined. The EGR flow rate is based on the volumetric efficiency, the intake manifold air density, an engine displacement volume, the engine speed, and the intake manifold air mass flow rate. The engine is controlled based on the EGR flow rate.

It is to be appreciated that methods and engines of the present invention may utilize a wide variety of techniques to determine the intake manifold air mass flow rate, and the engine may include a variable geometry turbocharger (VGT) system. Suitable air mass flow rate determination techniques include hot-wire or hot-film based techniques at the compressor inlet to measure fresh charge air flow, as well as equivalent techniques that, for example, make determinations based on pressure and temperature during the stable flow process at the compressor.

In one embodiment, determining the engine volumetric efficiency further comprises determining an engine exhaust to intake pressure ratio. A correction factor based on the engine exhaust to intake pressure ratio is determined. The engine volumetric efficiency is further based on the correction factor.

In another embodiment, determining the engine volumetric efficiency further comprises establishing a neural network. The neural network receives the engine speed, an intake manifold air pressure, an intake manifold air temperature, and an exhaust pressure as inputs, and provides the engine volumetric efficiency as an output.

Preferably, determining the EGR flow rate further comprises determining the EGR flow rate according to $$\dot{m}_{EGR} = \eta_v \rho_{a,i} V_d N/2 - \dot{m}_{charge}$$

where $\eta_v$ is the engine volumetric efficiency, $\rho_{a,i}$ is the intake manifold air density, $V_d$ is the engine displacement volume, N is the engine speed, $\dot{m}_{charge}$ is the intake manifold air mass flow rate, and $\dot{m}_{EGR}$ is the EGR flow rate. This equation is applicable for a 4 cycle internal combustion engine and would be modified if applied to a 2 cycle internal combustion engine.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 1 is a diagram that illustrates an internal combustion engine with VGT and EGR systems in the preferred embodiment of the present invention;

FIG. 2 illustrates a method for controlling an internal combustion engine;

FIG. 3 illustrates an embodiment utilizing a correction factor; and

FIG. 4 illustrates an embodiment utilizing a neural network.

DETAILED DESCRIPTION OF THE PREFERRED EMBODIMENT

FIG. 1 illustrates an internal combustion engine including an engine block 10 defining a plurality of cylinders, with each cylinder receiving fuel from a fuel injector. In a preferred embodiment, the internal combustion engine is a compression-ignition internal combustion engine, such as a heavy duty diesel fuel engine. The engine includes a VGT system for providing pressurized intake air to the plurality of cylinders. VGT turbine 12, compressor 14, and cooler 16 compose the VGT system. The pressure of the engine exhaust gases causes VGT turbine 12 to spin. VGT turbine 12 drives compressor 14. Compressor 14 pressurizes intake air to develop increased power during combustion. Charge air cooler 16 cools the pressurized air. The VGT system has moveable components that can change the turbocharger geometry by changing the area or areas in the turbine stage to which exhaust gases flow, and/or changing the angle at which the exhaust gases enter or leave the turbine. The turbocharger supplies varying amounts of turbo boost pressure depending on the turbocharger geometry. The VGT system in embodiments of the present invention may take any suitable form. For example, a variable inlet nozzle to the turbine, a moveable sidewall in the turbine housing, or any other controllable air pressurizng device including the above examples, and including a modulated wastegate valve may compose the VGT system.

EGR valve 18 and cooler 20 compose the EGR system. The EGR system introduces a metered portion of the exhaust gases into the intake manifold. The exhaust gases lower combustion temperatures to reduce the level of oxides of nitrogen ($NO_x$) that are produced. In embodiments of the present invention, the EGR system may take any suitable form. For example, a butterfly valve is a suitable EGR valve.

With continuing reference to FIG. 1, the engine also includes a controller 22. Controller 22 communicates with the VGT system and the EGR system to control the engine. Controller 22 may take any suitable form. A suitable controller includes a programmed microprocessor. In operation, controller 22 receives signals from the various vehicle and engine sensors and executes programmed logic embedded in hardware and/or software to control the engine.

Generally, the VGT system provides pressurized intake air to the engine cylinders, and the EGR system provides a metered portion of the exhaust gases to the engine cylinders. The turbo boost pressure results in increased power while the introduction of exhaust gases lowers combustion temperatures. Controller 22 operates the engine and controls the VGT system and EGR system in accordance with the current engine operating mode which is based on any number of engine conditions. During modes that require EGR, EGR flow rate is controlled by controller 22 issuing commands to EGR valve 18. FIGS. 2–4 illustrate EGR valve control in the preferred embodiment.

At block 30, an air mass flow rate through the intake manifold is determined at a location upstream of the exhaust gas introduction. Specifically, an air mass flow sensor at the compressor inlet measures the fresh charge air flow. The air mass flow sensor may be hot-wire or hot-film based. Because the compressor inlet flow is quite stable, accurate measurement can be readily obtained. At the same time, the engine volumetric efficiency can be mapped for various engine operating conditions. Volumetric efficiency is the ratio of effective engine displacement volume to total engine displacement volume. In general, the volumetric efficiency mapping can be established as a function of engine speed and intake manifold density. Intake manifold density is a function of intake manifold pressure and temperature. Engine speed, intake manifold air density, and volumetric efficiency are determined at blocks 32, 34, and 36, respectively. Some corrections can be applied to account for other factors such as engine exhaust to intake pressure ratio. The mapping can be accomplished via a look-up table of intake manifold density and engine speed. Block 50 illustrates determining an engine exhaust to intake pressure ratio. Block 52 illustrates determining a correction factor based on the engine exhaust to intake pressure ratio, with the engine volumetric efficiency being further based on the correction factor. As an alternative, a neural network model can be built to map the volumetric efficiency as a function of multiple variables including engine speed, intake manifold pressure and temperature, exhaust manifold pressure, or turbocharger geometry, etc. Establishing a neural network that receives a number of inputs and provides the engine volumetric efficiency as an output is indicated at block 60.

With the fresh charge flow measured and engine volumetric efficiency mapped, the EGR flow rate can be determined as follows:

$$\dot{m}_{EGR} = \eta_v \rho_{a,i} V_d N/2 - \dot{m}_{charge}$$

where $\eta_v$ is the engine volumetric efficiency, $\rho_{a,i}$ is the intake manifold air density, $V_d$ is the engine displacement volume, N is the engine speed, $\dot{m}_{charge}$ is the intake manifold air mass flow rate, and $\dot{m}_{EGR}$ is the EGR flow rate.

With continuing reference to FIG. 2, EGR flow rate is determined at block 38. The engine is controlled based on EGR flow rate at block 40.

The preferred embodiment of the present invention has several advantages over the existing direct measurement EGR flow rate techniques. First, the preferred embodiment can improve the accuracy of EGR flow rate because the fresh charge flow rate can be accurately measured in the stable flow stream at the compressor inlet, and the volumetric efficiency can be accurately mapped with look-up tables and/or neural network models based on test data. Second, the preferred embodiment can improve engine performance because of lower EGR circuit restriction due to the absence of orifice or venturi-type EGR flow meters. The hot-wire or hot-film fresh charge air flow meter in the preferred embodiment poses very little restriction in the charge air flow path. Third, in the preferred embodiment, not using a pressure measurement based flow meter (orifice or venturi) in the EGR circuit reduces sensor malfunction possibilities and potential warranty costs for the engine manufacturer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine, the engine including an engine block defining a plurality of cylinders, an intake manifold for supplying air to the plurality of cylinders, a controller, and an exhaust gas recirculation (EGR) system, the EGR system introducing a metered portion of exhaust gases to the intake manifold, the controller communicating with the EGR system to control the engine, the method comprising:

determining an air mass flow rate through the intake manifold at a location upstream of the exhaust gas introduction;

determining an engine speed;

determining an intake manifold air density;

determining an engine volumetric efficiency based on the engine speed and the intake manifold air density;

determining an EGR flow rate based on the volumetric efficiency, the intake manifold air density, an engine displacement volume, the engine speed, and the intake manifold air mass flow rate; and controlling the engine based on the EGR flow rate.

2. The method of claim 1 wherein determining the engine volumetric efficiency further comprises:

determining an engine exhaust to intake pressure ratio; and determining a correction factor based on the engine exhaust to intake pressure ratio, wherein the engine volumetric efficiency is further based on the correction factor.

3. The method of claim 1 wherein determining the engine volumetric efficiency further comprises:

establishing a neural network that receives the engine speed, an intake manifold air pressure, an intake manifold air temperature, and an exhaust pressure as inputs, and provides the engine volumetric efficiency as an output.

4. The method of claim 1 wherein determining the EGR flow rate further comprises:

determining the EGR flow rate according to $$\dot{m}_{EGR} = \eta_v \rho_{a,i} V_d N/2 - \dot{m}_{charge}$$

where $\eta_v$ is the engine volumetric efficiency, $\rho_{a,i}$ is the intake manifold air density, $V_d$ is the engine displacement volume, N is the engine speed, $\dot{m}_{charge}$ is the intake manifold air mass flow rate, and $\dot{m}_{EGR}$ is the EGR flow rate.

5. An internal combustion engine, the engine including an engine block defining a plurality of cylinders, an intake manifold for supplying air to the plurality of cylinders, a controller, and an exhaust gas recirculation (EGR) system, the EGR system introducing a metered portion of exhaust gases to the intake manifold, the controller communicating with the EGR system to control the engine, the controller being programmed to control the internal combustion engine by:

determining an air mass flow rate through the intake manifold at a location upstream of the exhaust gas introduction;

determining an engine speed;

determining an intake manifold air density;

determining an engine volumetric efficiency based on the engine speed and the intake manifold air density;

determining an EGR flow rate based on the volumetric efficiency, the intake manifold air density, an engine displacement volume, the engine speed, and the intake manifold air mass flow rate; and controlling the engine based on the EGR flow rate.

6. The engine of claim 5 wherein determining the engine volumetric efficiency further comprises:

determining an engine exhaust to intake pressure ratio; and determining a correction factor based on the engine exhaust to intake pressure ratio, wherein the engine volumetric efficiency is fiercer based on the correction factor.

7. The engine of claim 5 wherein determining the engine volumetric efficiency further comprises:

establishing a neural network that receives the engine speed, an intake manifold air pressure, an intake manifold air temperature, and an exhaust pressure as inputs, and provides the engine volumetric efficiency as an output.

8. The engine of claim 5 wherein determining the EGR flow rate further comprises:

determining the EGR flow rate according to $$\dot{m}_{EGR} = \eta_v \rho_{a,i} V_d N/2 - \dot{m}_{charge}$$

where $\eta_v$ is the engine volumetric efficiency, $\rho_{a,i}$ is the intake manifold air density, $V_d$ is the engine displacement volume, N is the engine speed, $\dot{m}_{charge}$ is the intake manifold air mass flow rate, and $\dot{m}_{EGR}$ is the EGR flow rate.

* * * * *

UNITED STATES PATENT AND TRADEMARK OFFICE
CERTIFICATE OF CORRECTION

PATENT NO.    : 6,820,600 B1
DATED         : November 23, 2004
INVENTOR(S)   : Kevin Dean Sisken et al.

It is certified that error appears in the above-identified patent and that said Letters Patent is hereby corrected as shown below:

Column 6,
Line 34, delete "fiecer" and insert therefor -- further --.

Signed and Sealed this

Fifteenth Day of March, 2005

JON W. DUDAS
*Director of the United States Patent and Trademark Office*